United States Patent
Lipponen

(10) Patent No.: US 7,111,807 B2
(45) Date of Patent: Sep. 26, 2006

(54) ARRANGEMENT IN CATAPULT

(75) Inventor: Pentti Lipponen, Kangasala (FI)

(73) Assignee: Robonic Oy, Tampere (FI)

( * ) Notice: Subject to any disclaimer, the term of this patent is extended or adjusted under 35 U.S.C. 154(b) by 0 days.

(21) Appl. No.: 11/068,309

(22) Filed: Feb. 28, 2005

(65) Prior Publication Data

US 2005/0230533 A1    Oct. 20, 2005

Related U.S. Application Data

(63) Continuation of application No. PCT/FI03/00668, filed on Sep. 12, 2003.

(30) Foreign Application Priority Data

Sep. 16, 2002    (FI) .................................. 20021653

(51) Int. Cl.
*B64F 1/06*    (2006.01)
(52) U.S. Cl. .......................................... 244/63; 124/61
(58) Field of Classification Search ................. 244/63; 124/61, 70
See application file for complete search history.

(56) References Cited

U.S. PATENT DOCUMENTS

| | | | |
|---|---|---|---|
| 1,204,803 A * | 11/1916 | McCullough ................ | 124/61 |
| 1,535,475 A * | 4/1925 | Jeansen et al. ................ | 244/63 |
| 1,777,167 A * | 9/1930 | Forbes ......................... | 244/63 |
| 1,960,264 A * | 5/1934 | Heinkel ....................... | 244/63 |
| 2,515,205 A * | 7/1950 | Fleux .......................... | 244/63 |
| 3,534,929 A | 10/1970 | Johansen et al. | |
| 4,238,093 A * | 12/1980 | Siegel et al. .................. | 244/63 |

FOREIGN PATENT DOCUMENTS

| | | |
|---|---|---|
| GB | 150411 A | 8/1920 |
| GB | 2293146 A | 3/1996 |

* cited by examiner

*Primary Examiner*—Galen Barefoot
(74) *Attorney, Agent, or Firm*—Ladas & Parry LLP

(57) ABSTRACT

A catapult for launching an unmanned aircraft. The catapult comprises a first carriage, to which the aircraft (5) can be arranged. The catapult further comprises a launching cylinder (23) that is arranged to move the carriage (4) in the launch direction (B) by means of a pulling element, such as a rope, and also a pulley mechanism. The carriage can be moved in the return direction (C) by means of a returning device (31) and a return-side pulley mechanism (51).

12 Claims, 3 Drawing Sheets

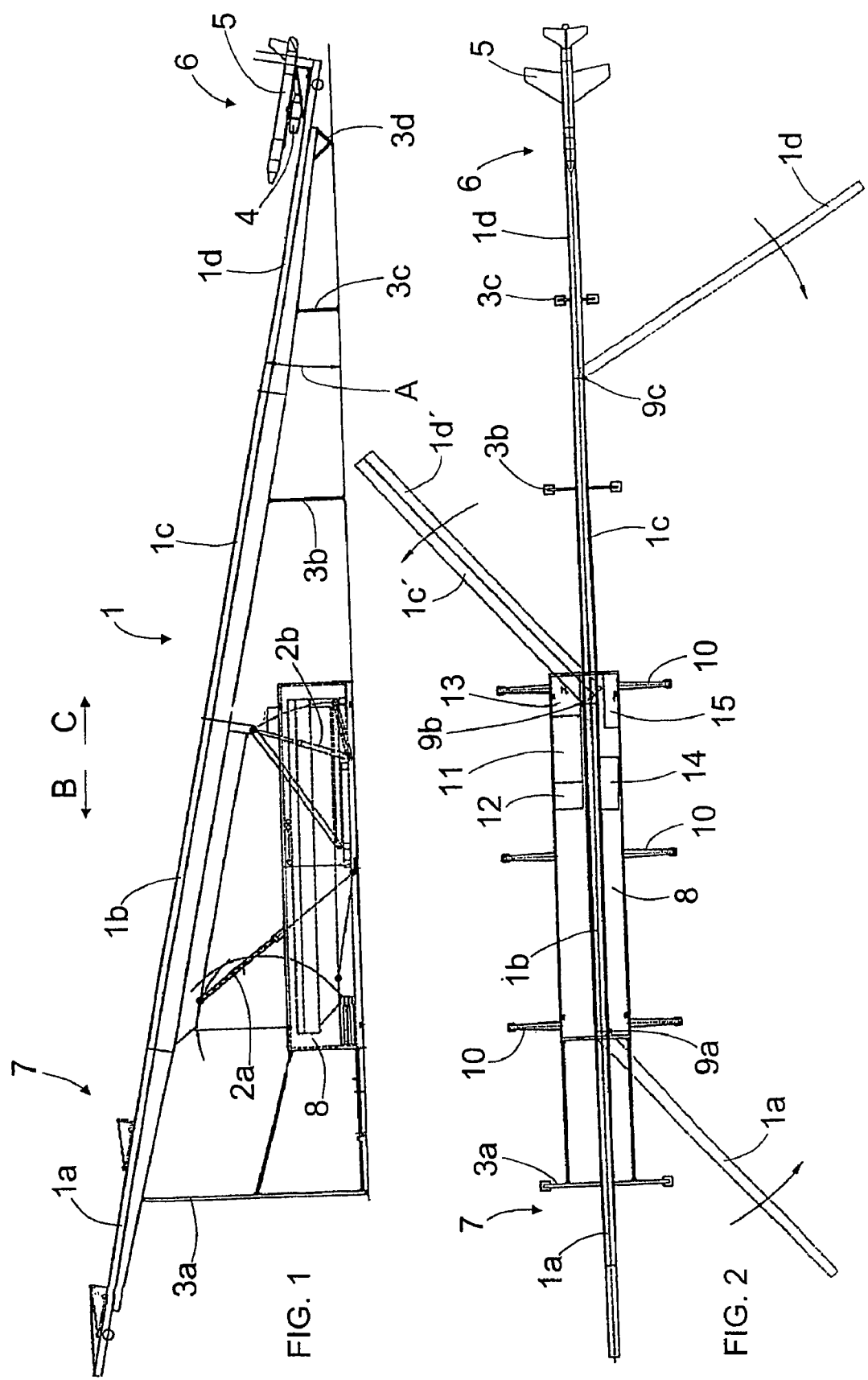

US 7,111,807 B2

ARRANGEMENT IN CATAPULT

This is a continuation of International Application PCT/FI2003/00668 filed on Sep. 12, 2003, which designated the U.S., claims the benefit thereof and incorporates the same by reference.

FIELD OF THE INVENTION

The invention relates to a catapult for launching an un-manned aircraft, which catapult comprises a first carriage that is movable in the longitudinal direction of the frame from a launch position to a release position and back, and whereto the aircraft is supported. The catapult further comprises a second carriage and at least one launching cylinder arranged to move the second carriage. A pulley mechanism is arranged in connection with the second carriage. A pulling element is arranged to run via at least one launch-side pulley mechanism and to transmit the motion of the second carriage to the first carriage using a predetermined transmission ratio provided by the pulley mechanism for moving the first carriage from the launch position to the release position.

BACKGROUND OF THE INVENTION

It is possible to use a catapult for launching a light, un-manned aircraft, such as a drone, a reconnaissance plane or a missile, from ground to air. A catapult typically comprises a carriage, to which an aircraft is connected and which is slung at a high velocity so as to give the aircraft a controlled initial velocity and direction for a take-off. The carriage can be moved by means of a pneumatic cylinder or a hydraulic cylinder, which is connected with a cable to act on the carriage. In order to provide as long an acceleration path as possible for the aircraft with a relatively short cylinder stroke length it is known to arrange a pulley mechanism in connection with the cable.

A problem with the current catapults is slow return of the carriage for a new launch.

BRIEF DESCRIPTION OF THE INVENTION

It is an object of the present invention to provide a novel and improved catapult for launching an unmanned aircraft.

The catapult according to the invention is characterized in that the pulling element comprises a launch-side portion acting from the first carriage in the launch direction and a return-side portion acting in the return direction, that in connection with the second carriage there is at least one return-side pulley mechanism that comprises at least one pulley, that the return-side portion of the pulling element is arranged to run through the return-side pulley mechanism so as to provide a predetermined transmission ratio, that the returning device is arranged to transfer the second carriage in the return direction that is opposite to the launch direction, and that the launch-side pulley mechanism and the return-side pulley mechanism have substantially the same transmission ratio, whereby the transfer of the second carriage in either direction of motion is arranged to move the first carriage for substantially the same distance.

The basic idea of the invention is that the second carriage is provided with a return-side pulley mechanism in addition to the launch-side pulley mechanism. When the returning device moves the second carriage in the return direction, the return motion is transmitted by means of the return-side pulley mechanism and the pulling element portion running there through to the first carriage.

The invention has an advantage that thanks to the return-side pulley mechanism the first carriage can be returned very fast to the launch position for a new launch.

The basic idea of an embodiment of the invention is that the launching cylinder is pneumatic and that it is connected to a substantially closed compressed air circuit. The launching cylinder communicates with at least one pressure accumulator, which is able to accumulate the compressed air required for one launch. The pressure accumulator is charged for a new launch such that a returning device pushes a piston rod of the launching cylinder in by means of the carriage, and a rise in pressure produced in the working pressure space of the launching cylinder is transmitted to the pressure accumulator so as to charge it.

The basic idea of an embodiment of the invention is that the pulling element is arranged to form a loop, whereby the second ends thereof are connected to the frame. The pulling element further comprises two separate portions, namely a launch-side portion and a return-side portion, the first ends of both being connected to the first carriage.

The basic idea of an embodiment of the invention is that a rope is employed as the pulling element. Further, the specific weight of the rope to be employed, i.e. the ratio of mass to unit volume, is less than 4.0 kg/liter. In one preferred embodiment the specific weight of the rope is less than 1.0 kg/liter. The use of a light rope enables a high speed of motion. Also, when the rope is light, it is possible to launch heavier aircraft with the catapult.

The basic idea of an embodiment of the invention is that the rope to be employed is made at least mainly of plastic material. For instance, the rope can be made of polyethene, polyamide, polypropylene, polyester or suitable combinations thereof. The rope made of plastic material is strong, light, flexible and inexpensive.

The basic idea of an embodiment of the invention is that the rope to be employed has a composite structure and it comprises a first component of plastic material and a second component of suitable reinforcement. The reinforcement can be glass fibre, carbon fibre or aramid fibre, for instance.

BRIEF DESCRIPTION OF THE DRAWINGS

The invention will be described in greater detail in connection with the attached drawings, wherein FIG. 1 is a schematic side view of a catapult according to the invention set in a launch-ready position;

FIG. 2 is a schematic top view of the catapult of FIG. 1;

For the sake of clarity, the FIGURES show the invention in a simplified manner. Like reference numerals refer to like parts in the figures.

DETAILED DESCRIPTION OF THE DRAWINGS

Figure 3:
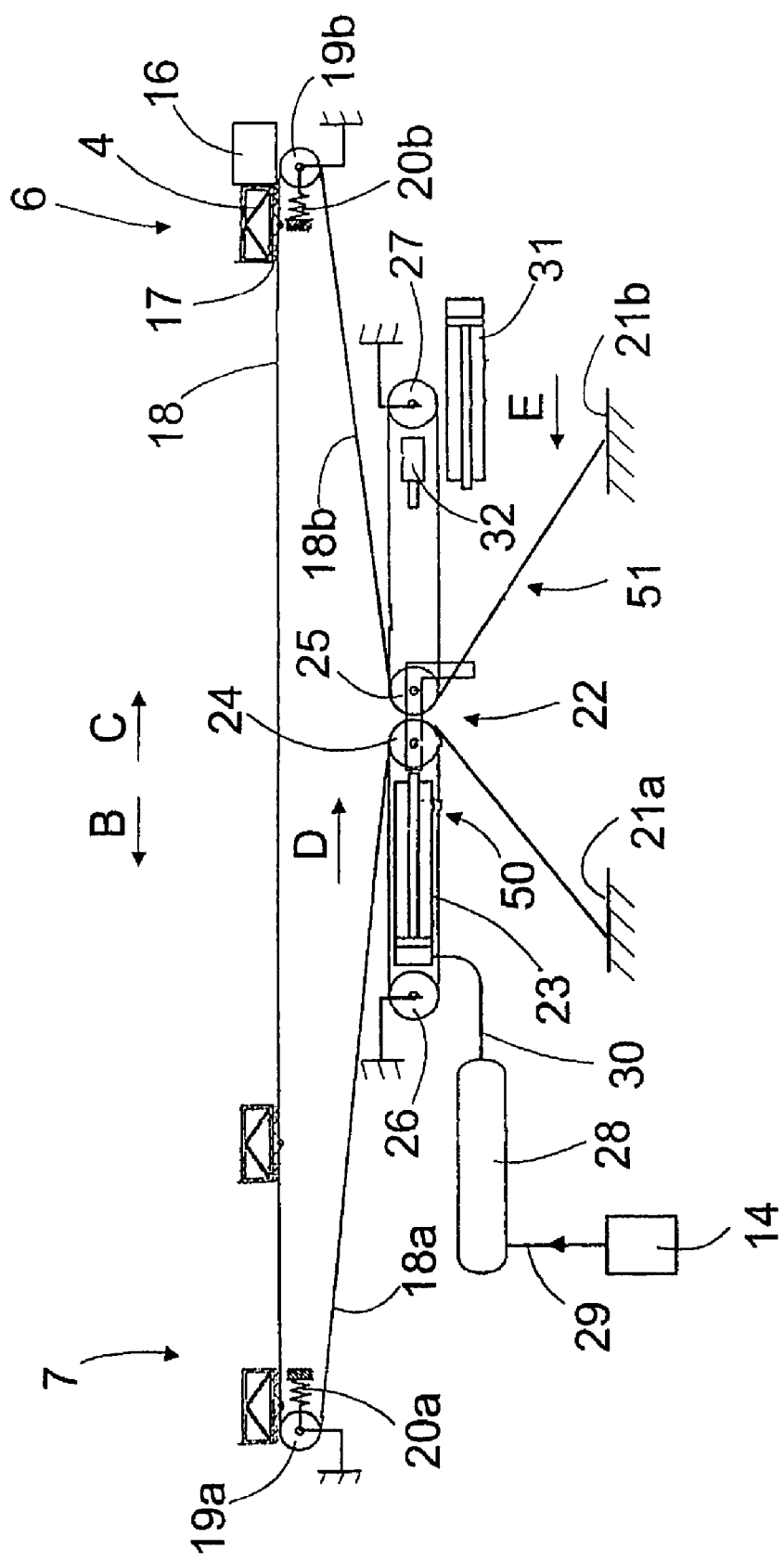
FIG. 3 shows schematically the operating principle of a launch mechanism of the catapult of the invention.

FIG. 1 shows a catapult according to the invention set in a launch-ready position. The catapult comprises an elongated frame 1, which may consist of a plurality of frame parts 1a to 1d that are movable with respect to one another. The frame parts 1a to 1d can be of rectangular tube, for instance. The frame 1 can be lifted and lowered such that a desired launching angle A is achieved. The frame 1 can be lifted, for instance, by means of hydraulic cylinders 2a and 2b. In addition, the frame 1 can be supported by a required number of supports 3a to 3d. The catapult further comprises a first carriage 4 that can be moved in the longitudinal direction of the frame 1. The frame 1 comprises guiding surfaces or corresponding means, by means of which the first carriage 4 can be supported to the frame 1. The first carriage 4 comprises securing means for securing an aircraft 5. The securing means are provided such that they support the aircraft 5 prior to and during the launch, but allow the aircraft 5 to be released in the release position 7. The securing means can be of any type known per se.

Be means of the catapult, the aircraft 5 is given a high initial velocity on a relatively short acceleration path. In principle, the aircraft 5 can be any relatively light, unmanned airframe. The aircraft can be provided with own propulsion device, such as a propeller, a jet engine or a rocket engine, and the aircraft can comprise ailerons or other control means, wherewith it can be controlled by remote control or automatically utilizing the control mechanism in the aircraft. The aircraft 5 of this kind can be used, for instance, for aerial photography and reconnaissance for civilian and military purposes alike. Furthermore, it can be used as a drone for weapon and radar mechanisms. On the other hand, the aircraft 5 can be a missile-like airframe that is provided with explosives or other effective agents intended for military use.

The catapult can be fixedly installed in the launching site or it can be a mobile device. A mobile catapult may consist of modules, which can be transported to the launching site and of which the catapult can be assembled relatively quickly. On the other hand, the catapult can be arranged on a movable platform, such as a platform of a truck, a cross-country vehicle, a trailer or a watercraft. The catapult can be arranged on a movable platform in a fixed manner or it can be an accessory that is readily detachable from the platform.

It appears from FIG. 2 how the catapult can be converted from the launch position to the transport position. The catapult comprises a container 8, within which frame parts 1a to 1d can be disposed. The frame 1 and the container 8 can be integrated. The container 8 may also be part of the frame 1. Between the frame parts 1a to 1d there can be arranged hinges 9a to 9c, which enable the frame parts to be folded up in juxtaposition. The folding can be carried out by means of hydraulic cylinders, for instance. In FIG. 2, broken lines indicate frame parts 1a' to 1d' in different stages of folding. It also appears that the container 8 can be supported on a base by means of hydraulic stabilizers 10. The container 8 can be a compact transport unit that comprises substantially all equipment necessary for a launch apart from the aircraft 5.

The container 8 may include a power device 11, such as a combustion engine, which can be arranged to drive a generator 12 for generating electricity. The container 8 may further include a hydraulic pump 13 and a compressor 14 for producing necessary pressure medium flows. The catapult control mechanism 15 with control devices may also be located in the container 8. The container 8 can be designed to measure standard transportation containers, which allows the container 8 to be handled with conventional lifting apparatuses.

FIG. 3 shows the structure and operating principle of the launch mechanism of the catapult according to the invention in a highly simplified manner. For the sake of clarity, FIG. 3 does not show the frame 1 nor the aircraft 5. The first carriage 4 is in a launch position 6, where it is held immobile by means of a locking device 16. The carriage 4 can comprise rolls 17, glide blocks or similar means that are arranged against the guides (not shown) of the frame 1. At least one pulling element 18, usually a rope, is connected to the carriage 4. The pulling element 18 is arranged to run round sheaves 19a and 19b. The sheaves 19a and 19b are arranged in the first end and in the second end, respectively, of the elongated frame 1 such that the carriage 4 can be moved from the launch position 6 to the release position 7, and vice versa, by pulling the pulling element 18 either in the launch direction B or in the return direction C. In connection with the sheaves 19a and 19b there can be tighteners 20a and 20b, by which it is possible to provide suitable tightness for the pulling element 18. It is obvious that instead of one pulling element 18, the catapult may comprise a plurality of pulling element. Naturally, in that case the number of sheaves, tighteners and other relating means is arranged to be in accordance with the number of pulling element.

The pulling element 18 forms an open loop whose free ends are connected to the frame 1 at points 21a and 21b. The loop formed by the pulling element may consist of one piece. Alternatively, the pulling element 18 may comprise a plurality of pieces arranged substantially consecutively. Irrespective of the structure of the pulling element 18, it comprises a launch-side portion 18a and a return-side portion 18b.

The catapult further comprises a second carriage 22 that can be moved with respect to the frame 1 by means of a launching cylinder 23 in the cylinder travel direction D. The second carriage 22 comprises one or more first pulleys 24, through which the launch-side portion 18a of the pulling element is arranged to run. Correspondingly, the carriage 22 comprises one or more second pulleys 25, through which the return-side portion 18b of the pulling element is arranged to run. The launch-side portion 18a of the pulling element can further be arranged to run round one or more first sheaves 26. Correspondingly, the return-side portion 18b of the pulling element can be arranged to run round one or more second sheaves 27. The sheaves 26 and 27 are supported to the frame 1. The first pulley 24 and the first sheave 26 constitute the launch-side pulley mechanism 50, and correspondingly, the second pulley 25 and the second sheave 27 constitute the return-side pulley mechanism 51, and therefore as the second carriage 22 moves a given distance in the launch direction D the first carriage 4 can move a many times longer distance in the launch direction B. The transmission ratio of the pulley mechanisms 50, 51 depends on how many rounds the pulling element 18a and 18b run round the pulley 24 and the sheave 26, and the pulley 25 and the sheave 27, respectively.

The launching cylinder 23 is pressure-medium-operated, i.e. it is driven by the pressure of a gas or a liquid. FIG. 3 shows a pneumatic launching cylinder 23, whose working pressure space communicates with a pressure accumulator 28 through a channel 30. The pressure accumulator 28 is designed such that it can store the amount of gas required for a launch. The gas to be used can be air or any other gas suitable for the purpose. In connection with the pressure accumulator 28 there is a supply channel 29, through which it is possible to supply compressed air, when necessary, from a compressor 14 or another compressed air source. For the sake of clarity, FIG. 3 does not show valves and other regulating components in the channels 29 and 30. Launch velocity can be controlled by regulating the pressure that affects the working pressure space of the launching cylinder 23.

The catapult further comprises at least one returning device 31, which can be a hydraulic cylinder as shown in FIG. 2, which is arranged to return the second carriage 22 back to the point corresponding to the launch position in direction E. Alternatively, the returning device 31 can be a pneumatic cylinder, for instance, or it can be an electric motor or a hydraulic motor, which is arranged to act on the second carriage 22 by means of a gear rack, for instance. Because the returning device 31 is engaged to pull the first carriage 4 by means of the return-side pulley mechanism 51, the travel to be performed by the returning device 31 can be short as compared with the travel performed by the carriage 4.

The catapult may still comprise at least one damper 32, by which the second carriage 22, and as a result also the first carriage 4, are halted after the first carriage 4 has reached the release position 7 and the aircraft 5 has been launched. The damper can be pressure-fluid- or gas-operated or it can be filled with gel. Further, in some cases it is possible to integrate the damper with the returning device 31 or the launching cylinder 23. There may be a plurality of dampers and they may be disposed at various places.

The catapult of FIG. 3 operates such that the aircraft 5 is arranged in the first carriage 4, which is held in the launch position 6 with the locking device 16. The pressure accumulator 28 is charged to have a predetermined pressure and the pressure is transmitted via the channel 30 to the launching cylinder 23, which tends to push the second carriage 22 in direction D. The launch-side pulling element 18a transmits the launching force to the first carriage 4. Not until the control mechanism 15 of the catapult has opened the locking device 16, does the first carriage 4 depart at an accelerating speed towards the release position 7. At the same time the launching cylinder 23 pushes the second carriage 22 in direction D. The loop size of the pulling element 18a in the launch-side pulley mechanism 50 increases and the loop size formed by the pulling element 18b in the return-side pulley mechanism 51 reduces substantially in proportion. The stroke length of the launching cylinder 23 is designed such that the cylinder 23 is able to push the first carriage 4 up to the release position 7. When the first carriage 4 has reached the release position 7, the motion is received by the damper 32. When the whole launch apparatus is stopped, it is possible to start preparations for a new launch. The second carriage 22 is pushed in direction E by means of the returning device 31 back to a position of launch. Simultaneously, the second carriage 22 pushes the piston rod of the launching cylinder 23 inwards, whereby the pressure in the working pressure space of the cylinder 23 increases. The created pressure is used for recharging the pressure accumulator 28. Thus, it will not be necessary to feed any new pressure medium into the mechanism for a new launch, but the pressure medium circulation between the launching cylinder 23 and the pressure accumulator 28 can be substantially closed. It is economical to use a catapult of this kind. Furthermore, the catapult can be provided with a relatively low output capacity compressor. On the other hand, after setting the catapult in the launch position the pressure accumulator 28 can be charged from one or more gas containers for the first launching event. The launching pressure can also be controlled by the pressure supplied from the gas container.

Figure 4:
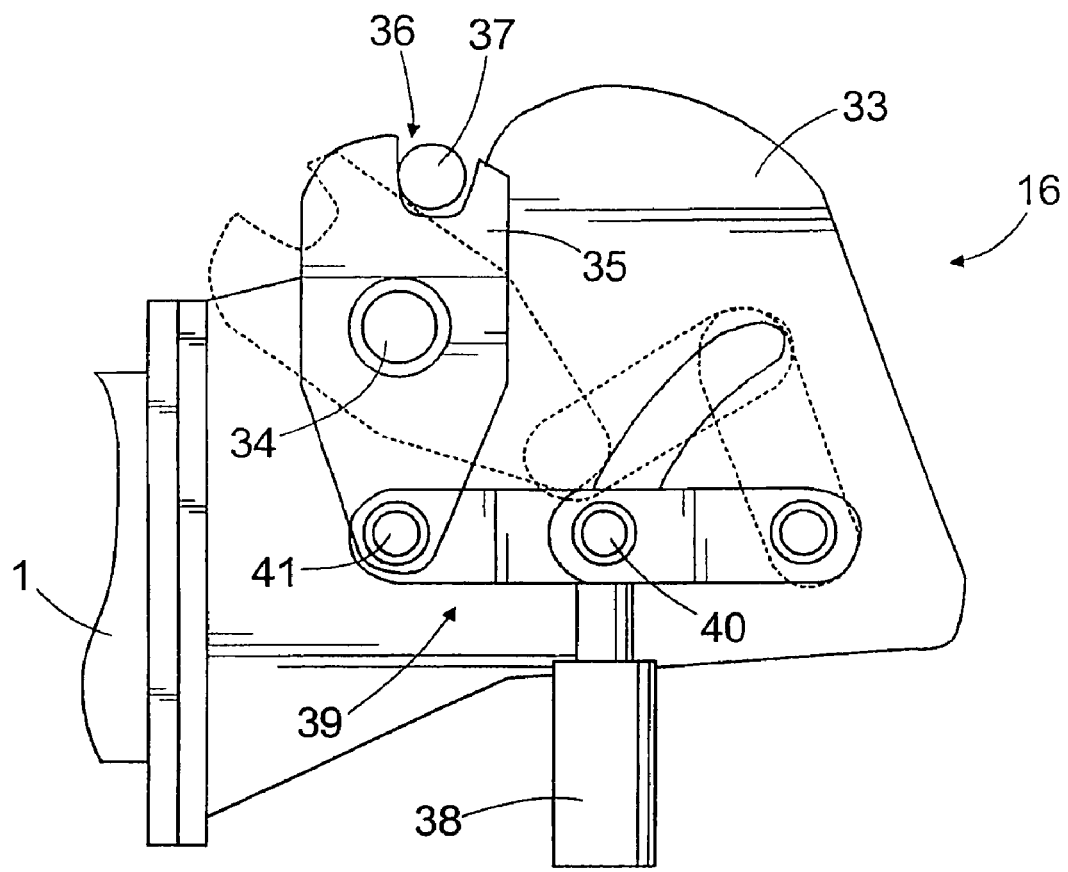
FIG. 4 is a schematic side view of a launch mechanism that can be applied to the catapult of the invention.

FIG. 4 is a side view of a locking device 16, which can be applied to the catapult of the invention. For the sake of clarity, the figure does not show the first carriage 4. The locking device 16 can be a replaceable component, which can be arranged in the rear end of the frame beam 1. The locking device 16 includes a frame 33, to which a locking part 35 is arranged pivotably in relation to a link 34. The locking part 35 has a notch 36, into which a locking pin 37 of the first carriage 4 can be arranged. Further, the locking device 16 comprises an actuator 38, for instance a hydraulic cylinder, which is arranged to turn the locking part 35 to open and closed positions by means of a link mechanism 39. When the actuator 38 pushes the link 40 upwards, it simultaneously pulls the link 41 to the right in the figure, thus causing the locking part 35 to turn anticlockwise to a position indicated by broken lines. So the locking pin 37 is able to come off the notch 36, whereby the carriage 4 is released and launches the aircraft.

Instead of the locking device 16 shown in FIG. 4, it is possible to use other locking devices, for instance hydraulic ones, and the locking device can be arranged to affect the second carriage 22 or the launching cylinder 23, instead of the first carriage 4. The locking device can thus be arranged to affect the first carriage 4 either directly or indirectly.

The pulling element 18 refers to a flexible transmission element with high tensile strength. In a conventional manner, a steel cable can be used in the catapult. Long metal cables have a large mass, however, which in some constructions may limit the capacity of the catapult, such as velocity to be achieved and the maximum mass of the aircraft. So, it is advantageous to use a rope whose specific weight is less than 4.0 kg/liter, which is a substantially lower value than that of the steel cable, whose specific weight is about 4.7 kg/liter. It is particularly advantageous to use a rope whose specific weight is less than 1.0 kg/liter. This rope can be made of plastic material, such as polyamide, polypropylene or polyester. The rope can also be made of large-molecule polyethene whose specific weight is only 0.77 kg/liter. It is also possible to apply various combinations of the above-mentioned plastic materials, for instance, such that the core and the surface layer of the rope are of different materials. Further still, it is possible to provide the rope to have a composite structure, whereby its core may consist of a reinforcement, such as glass fibre, carbon fibre or aramid fibre, and its surface layer is of a plastic material. Thus, the surface layer forms an impact-resistant layer round the reinforcement. In some cases the rope can be a composite that consists of plastic strands and metal strands.

It should also be mentioned that instead of the rope it is possible, at least in principle, to use another suitable pulling element, such as a belt or a chain. There are good reasons to use a rope, however, because it is flexible, strong and affordable.

The drawings and the relating specification is only intended to illustrate the inventive idea. The details of the invention may vary within the scope of the claims.

What is claimed is:

1. In an aircraft catapult for launching an unmanned aircraft, the improvements comprising:
   an elongated frame;
   a first carriage that is movable in a longitudinal direction of the frame from a launch position to a release position and back, and which first carriage comprises securing means for supporting the aircraft;
   a second carriage that is movable in the longitudinal direction of the frame;
   at least one launching cylinder that is pressure-medium-operated and that is arranged to move the second carriage at least in one direction;
   at least one pulley mechanism that comprises at least one pulley and that is arranged in connection with the second carriage;
   at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;

at least one locking device for locking and unlocking the first carriage in the launch position;

at least one damper that is arranged to make the first carriage halt in the release position;

at least one returning device that is arranged to return the first carriage from the release position to the launch position; and at least one return-side pulley mechanism in connection with the second carriage and comprising at least one pulley, wherein the pulling element comprises a launch-side portion acting from the first carriage in the launch direction and a return-side portion acting in the return direction, the return-side portion of the pulling element is arranged to run through the return-side pulley mechanism so as to provide a predetermined transmission ratio, the returning device is arranged to transfer the second carriage in the return direction that is opposite to the launch direction, the launch-side pulley mechanism and the return-side pulley mechanism have substantially the same transmission ratio, whereby the transfer of the second carriage in either direction of motion is arranged to move the first carriage for substantially the same distance, the launching cylinder is pneumatic, the launching cylinder is connected through a channel to at least one pressure accumulator, which can accumulate the gas required for one launch, the return motion of the second carriage is arranged to generate a return motion of the launching cylinder and a rise in the gas pressure in the working pressure space of the launching cylinder, the rise in the gas pressure resulting from the return motion of the launching cylinder is arranged to be transmitted to the pressure accumulator for a new launch, and the launching cylinder is connected to a substantially closed compressed air circuit.

2. A catapult as claimed claim 1, wherein each pulling element comprises a separate launch-side portion and a separate return-side portion, and the first end of the launch-side portion of the pulling element and correspondingly the first end of the return-side portion are connected to the first carriage.

3. A catapult as claimed in claim 1, wherein the returning device is a hydraulic cylinder.

4. A catapult as claimed in claim 1, wherein the damper is arranged in connection with the returning device.

5. In an aircraft catapult for launching an unmanned aircraft, the improvements comprising:

an elongated frame;

a first carriage that is movable in the longitudinal direction of the frame from a launch position to a release position and back, and which first carriage comprises securing means for supporting the aircraft;

a second carriage that is movable in the longitudinal direction of the frame;

at least one launching cylinder that is pressure-medium-operated and that is arranged to move the second carriage at least in one direction;

at least one pulley mechanism that comprises at least one pulley and that is arranged in connection with the second carriage;

at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;

at least one locking device for locking and unlocking the first carriage in the launch position;

at least one damper that is arranged to make the first carriage halt in the release position;

at least one returning device that is arranged to return the first carriage from the release position to the launch position; and at least one return-side pulley mechanism in connection with the second carriage and comprising at least one pulley, wherein the pulling element comprises a launch-side portion acting from the first carriage in the launch direction and a return-side portion acting in the return direction, the return-side portion of the pulling element is arranged to run through the return-side pulley mechanism so as to provide a predetermined transmission ratio, the returning device is arranged to transfer the second carriage in the return direction that is opposite to the launch direction, the launch-side pulley mechanism and the return-side pulley mechanism have substantially the same transmission ratio, whereby the transfer of the second carriage in either direction of motion is arranged to move the first carriage for substantially the same distance, the pulling element is a rope, and the rope is at least mainly of plastic material.

6. A catapult as claimed in claim 5, wherein the specific weight of the rope is less than 4.0 kg/liter.

7. A catapult as claimed in claim 5, wherein the specific weight of the rope is less than 1.0 kg/liter.

8. In an aircraft catapult for launching an unmanned aircraft, the improvements comprising:

an elongated frame;

a first carriage that is movable in the longitudinal direction of the frame from a launch position to a release position and back, and which first carriage comprises securing means for supporting the aircraft;

a second carriage that is movable in the longitudinal direction of the frame;

at least one launching cylinder that is pressure-medium-operated and that is arranged to move the second carriage at least in one direction;

at least one pulley mechanism that comprises at least one pulley and that is arranged in connection with the second carriage;

at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;

at least one locking device for locking and unlocking the first carriage in the launch position;

at least one damper that is arranged to make the first carriage halt in the release position;

at least one returning device that is arranged to return the first carriage from the release position to the launch position; and at least one return-side pulley mechanism in connection with the second carriage and comprising at least one pulley, wherein the pulling element comprises a launch-side portion acting from the first carriage in the launch direction and a return-side portion acting in the return direction, the return-side portion of the pulling element is arranged to run through the return-side pulley mechanism so as to provide a predetermined transmission ratio, the returning device is arranged to transfer the second carriage in the return direction that is opposite to the launch direction, the launch-side pulley mechanism and the return-side pulley mechanism have substantially the same transmission ratio, whereby the transfer of the second carriage in either direction of motion is arranged to move the first carriage for substantially the same distance, the pulling element is a rope, and the rope is of composite material, which comprises a first component of plastic material and a second component of reinforcement material.

9. In an aircraft catapult for launching an unmanned aircraft, the improvements comprising:

an elongated frame;

a first carriage that is movable in the longitudinal direction of the frame from a launch position to a release position and back, and which first carriage comprises securing means for supporting the aircraft;

a second carriage that is movable in the longitudinal direction of the frame;

at least one launching cylinder that is pressure-medium-operated and that is arranged to move the second carriage at least in one direction;

at least one pulley mechanism that comprises at least one pulley and that is arranged in connection with the second carriage;

at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;

at least one locking device for locking and unlocking the first carriage in the launch position;

at least one damper that is arranged to make the first carriage halt in the release position;

at least one returning device that is arranged to return the first carriage from the release position to the launch position; and at least one return-side pulley mechanism in connection with the second carriage and comprising at least one pulley, wherein the pulling element comprises a launch-side portion acting from the first carriage in the launch direction and a return-side portion acting in the return direction, the return-side portion of the pulling element is arranged to run through the return-side pulley mechanism so as to provide a predetermined transmission ratio, the returning device is arranged to transfer the second carriage in the return direction that is opposite to the launch direction, the launch-side pulley mechanism and the return-side pulley mechanism have substantially the same transmission ratio, whereby the transfer of the second carriage in either direction of motion is arranged to move the first carriage for substantially the same distance, and the frame of the catapult is connected to a transportation container, within which the frame can be arranged.

10. In an aircraft catapult for launching an unmanned aircraft, the improvements comprising:

an elongated frame;

a first carriage that is movable in the longitudinal direction of the frame from a launch position to a release position and back, and which first carriage comprises securing means for supporting the aircraft;

a second carriage that is movable in the longitudinal direction of the frame;

at least one launching cylinder that is pressure-medium-operated and that is arranged to move the second carriage at least in one direction;

at least one pulley mechanism that comprises at least one pulley and that is arranged in connection with the second carriage;

at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;

at least one locking device for locking and unlocking the first carriage in the launch position;

at least one damper that is arranged to make the first carriage halt in the release position;

at least one returning device that is arranged to return the first carriage from the release position to the launch position; and at least one return-side pulley mechanism in connection with the second carriage and comprising at least one pulley, wherein the pulling element comprises a launch-side portion acting from the first carriage in the launch direction and a return-side portion acting in the return direction, the return-side portion of the pulling element is arranged to run through the return-side pulley mechanism so as to provide a predetermined transmission ratio, the returning device is arranged to transfer the second carriage in the return direction that is opposite to the launch direction, the launch-side pulley mechanism and the return-side pulley mechanism have substantially the same transmission ratio, whereby the transfer of the second carriage in either direction of motion is arranged to move the first carriage for substantially the same distance, and the launch-side portion of the pulling element to runs around a first sheave provided with a first tightener and the return-side portion of the pulling element runs around a second sheave provided with a second tightener, whereby the tighteners provide tightness for the pulling element.

11. In an aircraft catapult for launching an unmanned aircraft, the improvements comprising:
an elongated frame;
a first carriage that is movable in the longitudinal direction of the frame from a launch position to a release position and back, and which first carriage comprises securing means for supporting the aircraft;
a second carriage that is movable in the longitudinal direction of the frame;
at least one launching cylinder that is pressure-medium-operated and that is arranged to move the second carriage at least in one direction;
at least one pulley mechanism that comprises at least one pulley and that is arranged in connection with the second carriage;
at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;
at least one locking device for locking and unlocking the first carriage in the launch position;
at least one damper that is arranged to make the first carriage halt in the release position;
at least one returning device that is arranged to return the first carriage from the release position to the launch position; and
at least one return-side pulley mechanism in connection with the second carriage and comprising at least one pulley,
wherein
the pulling element comprises a launch-side portion acting from the first carriage in the launch direction and a return-side portion acting in the return direction,
the return-side portion of the pulling element is arranged to run through the return-side pulley mechanism so as to provide a predetermined transmission ratio,
the returning device is arranged to transfer the second carriage in the return direction that is opposite to the launch direction,
the launch-side pulley mechanism and the return-side pulley mechanism have substantially the same transmission ratio, whereby the transfer of the second carriage in either direction of motion is arranged to move the first carriage for substantially the same distance, and
the elongated frame comprises a plurality of frame parts between which are hinges enabling the frame parts to be moved in horizontal direction with respect to one another and to thereby to be folded up in juxtaposition.

12. In an aircraft catapult for launching an unmanned aircraft, the improvements comprising:
an elongated frame;
a first carriage that is movable in the longitudinal direction of the frame from a launch position to a release position and back, and which first carriage comprises securing means for supporting the aircraft;
a second carriage that is movable in the longitudinal direction of the frame;
at least one launching cylinder that is pressure-medium-operated and that is arranged to move the second carriage at least in one direction;
at least one pulley mechanism that comprises at least one pulley and that is arranged in connection with the second carriage;
at least one pulling element that is engaged with the first carriage and the frame, and which pulling element is further arranged to run via at least one launch-side pulley mechanism and to transmit the motion of the second carriage to the first carriage using a predetermined transmission ratio provided by the pulley mechanism for moving the first carriage from the launch position to the release position;
at least one locking device for locking and unlocking the first carriage in the launch position;
at least one damper that is arranged to make the first carriage halt in the release position;
at least one returning device that is arranged to return the first carriage from the release position to the launch position; and
at least one return-side pulley mechanism in connection with the second carriage and comprising at least one pulley,
wherein
the pulling element comprises a launch-side portion acting from the first carriage in the launch direction and a return-side portion acting in the return direction,
the return-side portion of the pulling element is arranged to run through the return-side pulley mechanism so as to provide a predetermined transmission ratio,
the returning device is arranged to transfer the second carriage in the return direction that is opposite to the launch direction,
the launch-side pulley mechanism and the return-side pulley mechanism have substantially the same transmission ratio, whereby the transfer of the second carriage in either direction of motion is arranged to move the first carriage for substantially the same distance, and
the locking device includes a frame, to which a locking part is arranged pivotably in relation to a link, and further the locking part has a notch into which a locking pin of the first carriage is arrangeable, and wherein the locking device further comprises an actuator, which is arranged to turn the locking part to open and closed positions by means of a link mechanism.

* * * * *